United States Patent [19]

Richards

[11] 4,356,205

[45] Oct. 26, 1982

[54] METHOD AND APPARATUS FOR CUTTING CONTROLLED-VOLUME MEAT PORTIONS FROM A SEGMENT OF FRESH WHOLE-MUSCLE MEAT

[75] Inventor: Louis R. Richards, Mokena, Ill.

[73] Assignee: Formax, Inc., Mokena, Ill.

[21] Appl. No.: 200,604

[22] Filed: Oct. 24, 1980

[51] Int. Cl.$^3$ .......................... A22C 7/00; B29C 15/00; B29D 7/18

[52] U.S. Cl. .......................................... 426/518; 17/1 R; 17/32; 17/52; 83/19; 83/176; 83/465; 264/157; 425/302.1; 425/310; 426/513; 99/537

[58] Field of Search ...................... 425/289, 292, 302.1, 425/310, 308; 264/138, 157; 17/1 R, 32, 52; 83/19, 176, 465; 100/98 R, 255; 269/115, 208; 99/537; 426/513, 518

[56] References Cited

U.S. PATENT DOCUMENTS

| | | | |
|---|---|---|---|
| 775,181 | 11/1904 | Kent | 99/537 |
| 1,122,526 | 12/1914 | McCormick | 269/208 |
| 1,209,275 | 12/1916 | Finn | 426/513 |
| 1,727,976 | 9/1929 | Hunt | 269/115 |
| 2,003,619 | 6/1935 | Williamson | 269/87.2 |
| 2,101,755 | 12/1937 | Rosenstone et al. | 17/32 |
| 2,388,162 | 10/1945 | La Hatte | 269/208 |
| 2,597,592 | 5/1952 | Minder | 17/32 |
| 2,665,726 | 1/1954 | Lundell | 17/32 |
| 3,474,842 | 10/1969 | Jarvis et al. | 99/537 |
| 3,594,854 | 7/1971 | Roedel | 99/537 |
| 3,704,736 | 12/1972 | Pratley | 99/537 |
| 3,824,885 | 7/1974 | Marshall | 83/176 |
| 3,927,588 | 12/1975 | Laderach | 426/518 |
| 4,072,763 | 2/1978 | Mart | 426/518 |

FOREIGN PATENT DOCUMENTS

| | | | |
|---|---|---|---|
| 2227828 | 1/1975 | France | 17/32 |

*Primary Examiner*—Willard E. Hoag
*Attorney, Agent, or Firm*—Kinzer, Plyer, Dorn & McEachran

[57] ABSTRACT

A predetermined volume of the face part of a segment of boneless fresh whole-muscle meat (e.g. strip loin, tenderloin, top sirloin butt, or ribeye roll) is positioned in engagement with a stop plate and constrained in a first shaping clamp of given cross-sectional configuration and thickness, and an additional part of the meat segment is constrained in a second shaping clamp of approximately the same cross-sectional configuration, with both shaping clamps solidly filled; cutting the meat segment between the two shaping clamps forms a steak or other meat portion of closely controlled volume and weight.

10 Claims, 4 Drawing Figures

Fig. 3.
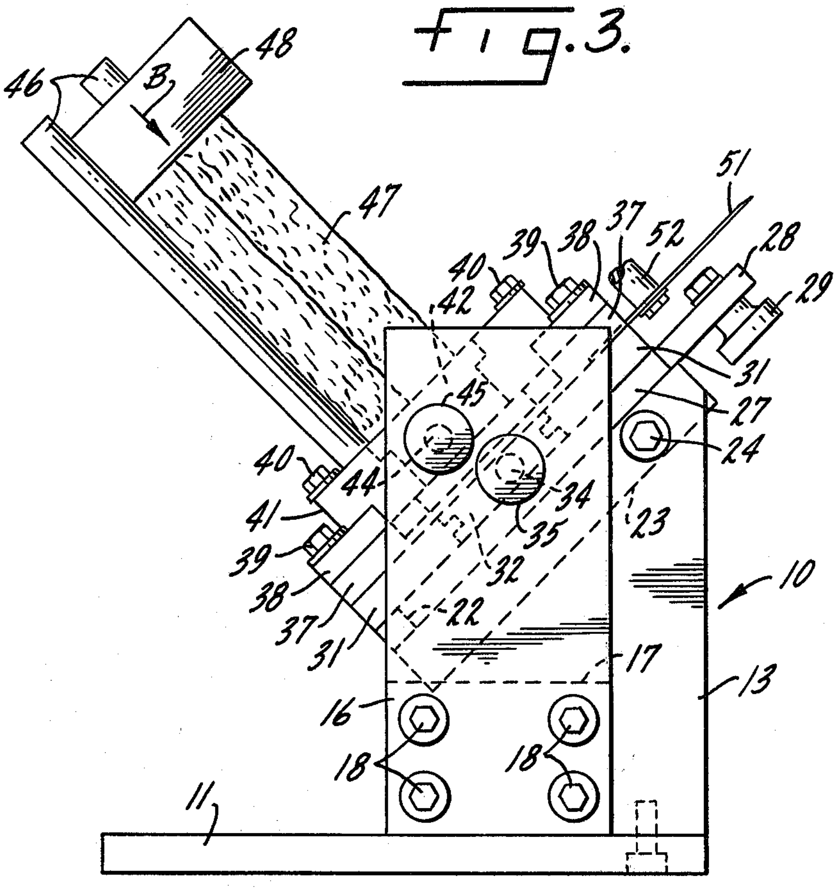
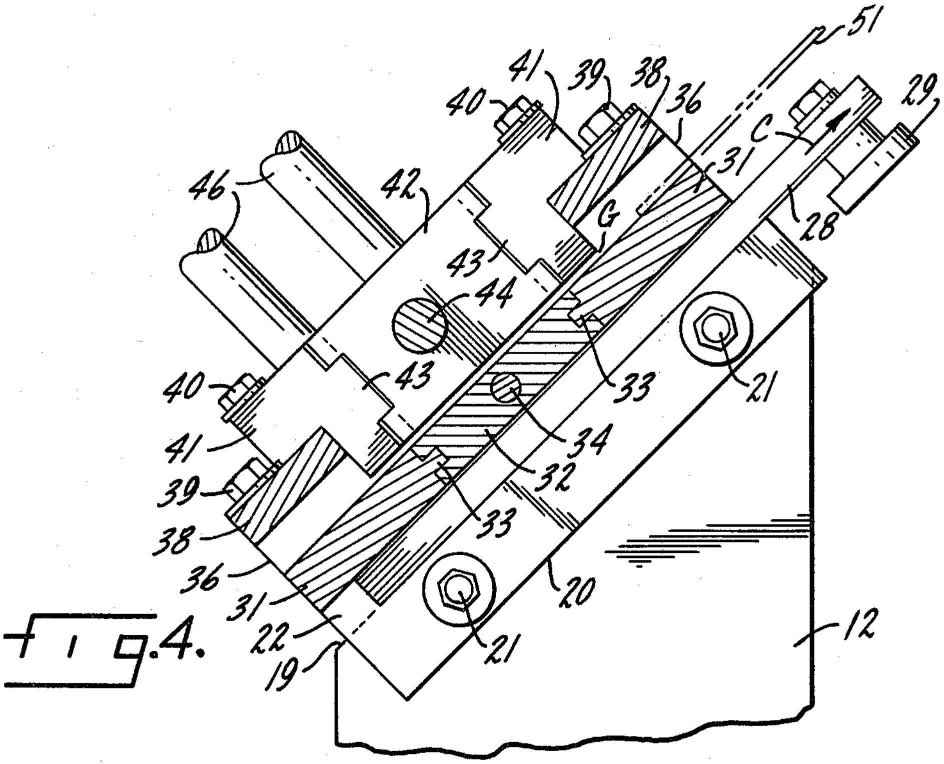
Fig. 4.

METHOD AND APPARATUS FOR CUTTING CONTROLLED-VOLUME MEAT PORTIONS FROM A SEGMENT OF FRESH WHOLE-MUSCLE MEAT

BACKGROUND OF THE INVENTION

The cutting of steaks, chops, and other meat portions of whole-muscle meat, in contrast to the forming of hamburger patties, sausages, and other formed meat products, remains essentially a manual operation. Usually, the meat is trimmed and then cut into individual portions by skilled meatcutters. The cut meat portions are subject to appreciable variation, depending upon the skills of the individual meatcutters.

One partially mechanized technique for cutting whole-muscle meat portions has seen some commercial use. In this process, a segment of boneless whole-muscle meat is first frozen and then partially thawed. In the partially thawed state, the meat segment is placed in a mold that molds it to a substantially uniform cross-sectional configuration. In this partially thawed state, the meat segment will hold the molded shape for a limited time after it is removed from the mold. Thus, essentially constant volume meat portions can be cut from the meat segment, immediately after removal from the mold, by equipment that simply cuts slices of uniform thickness. However, this technique cannot be effectively applied to unfrozen fresh meat, because the meat returns to its original shape almost immediately upon its removal from a mold.

A number of different methods and apparatus have previously been proposed for cutting slices of uniform thickness from individual fresh meat segments. One example is Hunt U.S. Pat. No. 1,727,979, which discloses a holding device for maintaining a segment of meat in fixed position for manual slicing. Another is Olson et al U.S. Pat. No. 3,148,720, which describes a slicing machine for liver. These devices produce slices of uniform thickness, but the slices vary in volume depending upon variations in the cross-sectional shape of the meat being sliced. For sausages and like processed meats, Marshall U.S. Pat. No. 3,824,885 discloses a slicing machine that produces essentially uniform slices; this machine presses the sausage into a given shape immediately ahead of the slicing station, relying upon the moldable nature of the sausage to achieve uniformity in the volume and weight of the slices.

Another early patent that permits the cutting of slices of uniform thickness from a whole-muscle meat segment is Kent U.S. Pat. No. 775,181. In that arrangement, a meat segment is placed in a closed box having slots in the sides and is pushed down into the box, forcing the meat into a given configuration, following which the meat is sliced by knives inserted through the slots. Like the Olson et al patent, this provides slices of uniform thickness but cannot produce meat portions of uniform weight unless the meat is shaped to a precise configuration before it is placed in the box. The Kent patent, on the other hand provides the only arrangement known to the applicant in which a segment of fresh whole-muscle meat is sliced while under partial constraint to a given shape.

None of these prior art arrangements permits the cutting of a segment of boneless fresh whole-muscle meat into meat portions of effectively and accurately controlled volume and weight.

SUMMARY OF THE INVENTION

It is a principal object of the present invention, therefore, to provide a new and improved method and apparatus for cutting a segment of boneless fresh whole-muscle meat, such as a strip loin, a tenderloin, a top sirloin butt, or a ribeye roll, to provide a series of meat portions (e.g., steaks) of controlled volume and weight without dependence upon the skill of a meatcutter and without partial freezing or other treatment of the meat segment to modify its resiliency or other physical characteristics prior to cutting.

A related object of the invention is to provide a new and improved method and apparatus for cutting a boneless fresh whole-muscle meat segment into a series of controlled volume meat portions that is rapid and accurate in operation and economical in fulfillment.

Accordingly, in one aspect of the invention relates to a meat slicing device for cutting successive controlled-volume meat portions from the face of a segment of fresh whole-muscle meat, comprising a stop plate and support means for supporting a fresh whole-muscle meat segment with the face of the meat segment aligned in surface-to-surface engagement with the stop plate. First shaping means, including the stop plate, are provided for constraining a predetermined thickness of the meat segment, at its face, into a shape of given cross-sectional configuration and thickness, and cutting means are afforded for cutting off the face portion of the meat segement, immediately behind the shaping means, while still under constraint, to form a controlled-volume meat portion. Preferably, the slicing machine also includes second shaping means for constraining an additional part of the meat segment, immediately adjacent the first shaping means, into approximately the same cross-sectional configuration as the first shaping means, the cutting means being located between the two shaping means.

In another aspect, the invention relates to a method of cutting successive controlled-volume meat portions from the face of a segment of fresh whole-muscle meat, comprising the following steps:

A. advancing a fresh whole-muscle meat segment along a given meat advancement path transverse to one face of the meat segment, into engagement with a stop plate;

B. constraining the face part of the meat segment, immediately adjacent the stop plate, in a shaping clamp of given cross-sectional shape and thickness, thereby constraining a predetermined volume of the meat in the shaping clamp;

C. cutting off the face part of the meat segment, immediately behind the shaping clamp, to form a controlled-volume meat portion;

D. removing the controlled-volume meat portion from the shaping clamp; and repeating steps A through D to form additional controlled-volume meat portions, cut from the same meat segment. Preferably, an additional part of the meat segment, immediately adjacent the aforesaid shaping clamp, is constrained to the same cross-sectional shape as in that clamp, in a second shaping clamp, the cut being made between the two clamps.

BRIEF DESCRIPTION OF THE DRAWINGS

FIG. 3 is a side elevation view taken from the opposite side of the meat slicing device from FIG. 1; and FIG. 4 is a sectional view, drawn to an enlarged scale, taken approximately as indicated by line 4—4 in FIG. 2.

DESCRIPTION OF THE PREFERRED EMBODIMENTS

FIGS. 1–4 illustrate a meat slicing device 10 for cutting successive controlled-volume meat portions from the face of a segment of fresh whole-muscle meat that is constructed in accordance with a preferred embodiment of the present invention and that is capable of performing the method of the invention. The primary utility of the device 10 is in the cutting of steaks and the device is referred to hereinafter as a steak slicer.

Figure 2:
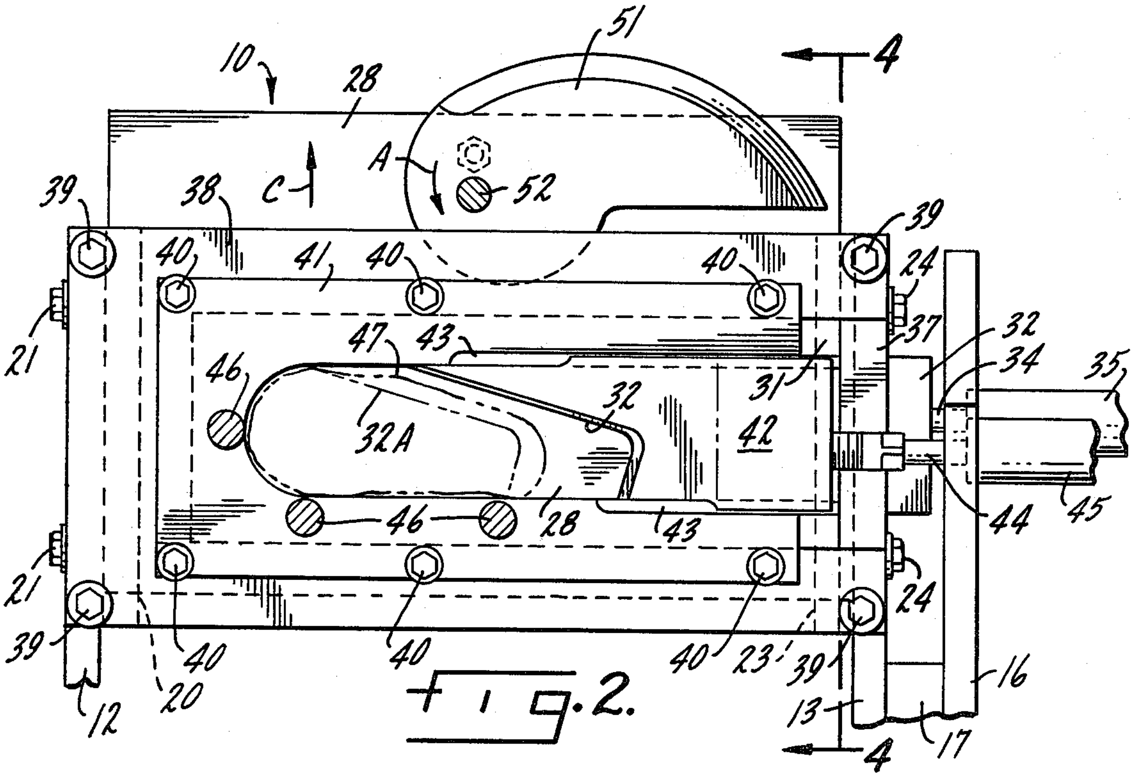
FIG. 2 is a top view, partially in cross-section, taken approximately as indicated by line 2—2 in FIG. 1.

Steak slicer 10 comprises a base plate 11 on which two main vertical frame members 12 and 13 are mounted by suitable means such as the mounting screws 14. At one side of the device, adjacent the main vertical frame member 13, an auxiliary vertical frame member 16 is mounted (FIGS. 2 and 3). The auxiliary frame member 16 is spaced from frame member 13 by a spacer block 17 and is secured to the main frame member 13 by appropriate means such as a plurality of bolts 18.

Figure 1:
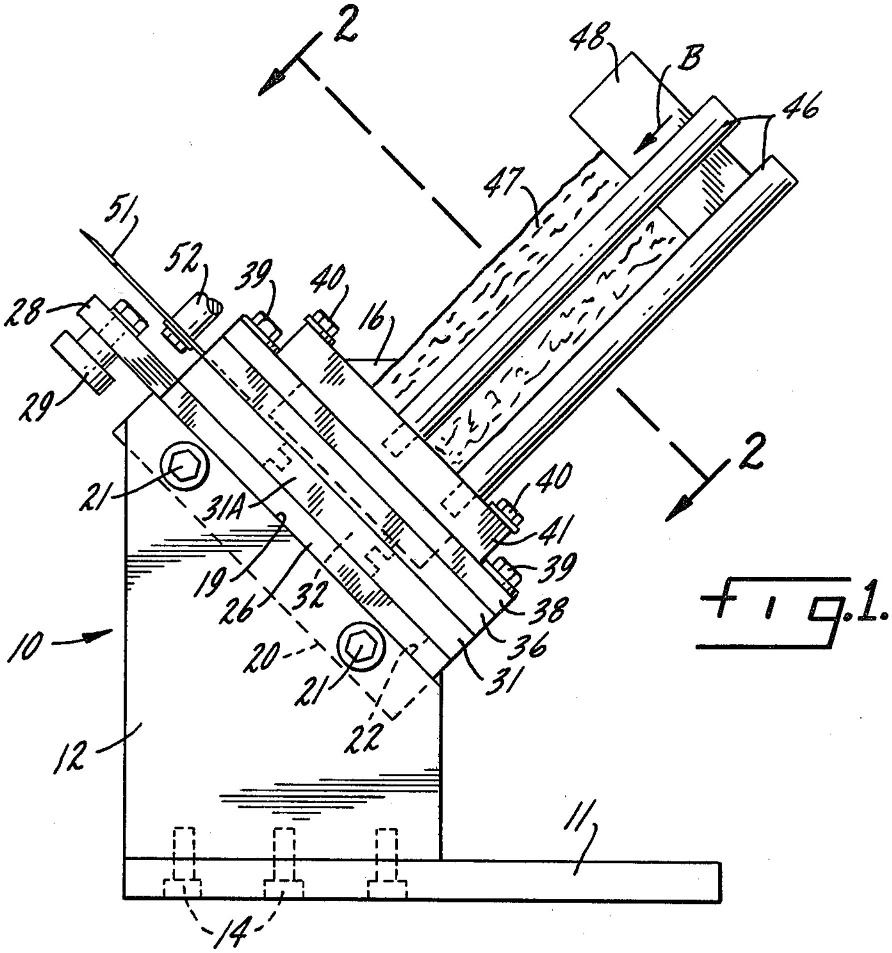
FIG. 1 is a side elevation view of a meat slicing device constructed in accordance with one embodiment of the invention and capable of carrying out the method of the invention.

As seen in FIG. 1, the main vertical frame member 12 has an upper surface 19 inclined at an angle of approximately forty-five degrees to the vertical. A bracket 20 having a top surface aligned with the top surface of the main vertical frame member 12 is mounted on the inner surface of that frame member by suitable means such as the bolts 21 as best shown in FIGS. 1 and 4. The lower end of bracket 20 includes an upward projection 22. A similar bracket 23 is mounted on the inner surface of the other main vertical frame member 13 by bolts 24; see FIGS. 2 and 3. A spacer rail 26 having a thickness equal to the height of the bracket projection 22 is mounted on the top surface 19 of main frame member 12 as shown in FIG. 1. Similarly, a spacer rail 27 is mounted on the top surface of the other main frame member 13, FIG. 3.

A stop plate 28 is slidably supported on the upper surfaces of the two brackets 20 and 23. Stop plate 28 may be provided with a handle 29 to permit ready removal of the stop plate from steak slicer 10 for purposes described hereinafter. Preferably, the thickness of stop plate 28 is made very slightly smaller than the height of the projections on the brackets, such as the projection 22 on bracket 20 (FIG. 4), to facilitate sliding movement of the stop plate.

A first C-shaped shaping clamp member 31 is mounted on the top surfaces of the two spacer rails 26 and 27, with the bight portion 31A of member 31 engaging the spacer rail 26 and the ends of the two legs of the clamp member engaging the spacer 27 as shown in FIGS. 1 and 3. A first shaping clamp slide 32 is slidably mounted in the C-shaped clamp member 31 as shown in FIGS. 2 and 4. Preferably, a key and slot slide mounting arrangement as shown by the keys 33 (FIG. 4) is utilized to assure accurate guidance for sliding movements of slide 32 relative to member 31. The outer end of slide 32 is connected to a drive rod 34 that is in turn connected to a suitable pneumatic or hydraulic drive cylinder 35 or other appropriate linear drive means. In the illustrated construction, the drive cylinder 35 for clamp slide 32 is mounted on the auxiliary vertical frame member 16 as best shown in FIG. 2.

A spacer rail 36 is mounted on the upper surface of the C-shaped clamp member 31 at the side of the steak slicer 10 adjacent the main vertical frame member 12 as shown in FIGS. 1, 2 and 4. A similar spacer rail 37 is mounted on the other end of clamp member 31, adjacent frame member 13, as shown in FIG. 3. A C-shaped transverse main frame member 38 is mounted on top of the spacer rails 36 and 37, spanning the full width of steak slicer 10 as shown in FIG. 2. A series of retainer bolts 39 extend downwardly through the transverse frame member 38, the spacer rails 36 and 37, the C-shaped clamp member 31, and the spacer rails 26 and 27 and are threaded into the vertical frame members 12 and 13 to maintain these elements of the steak slicer 10 in assembled condition.

A second C-shaped shaping clamp member 41 is mounted on the transverse frame member 38 by suitable means such as a series of mounting bolts 40. A second shaping clamp slide 42 is slidably mounted in clamp member 41 as best shown in FIGS. 2 and 4. Again, the preferred construction employs longitudinal keys 43 to assure accurate guidance of sliding movement of slide 42 in clamp member 41. Slide 42 is connected to a drive rod 44 that is in turn connected to a pneumatic or hydraulic drive cylinder 45 mounted on the auxiliary vertical frame member 16 (FIG. 2).

Steak slicer 10 further includes support means for supporting a fresh whole-muscle meat segment in the device; in steak slicer 10 this support means comprises a plurality of support rods 46 that are mounted on and project outwardly of clamp member 41 as best shown in FIGS. 1–3. A meat segment 47 supported on rods 46 and engaged at its outer end by advancing or biasing means for urging the meat segment into the steak slicer, toward the stop plate 28. In the illustrated embodiment, the biasing means is shown in its simplest form as a weight 48, but other forms of biasing or urging means may be employed as desired.

Steak slicer 10 must also include a cutting or slicing means. This cutting means may comprise a rotary knife 51 mounted on a shaft 52 and rotated in the direction indicated by the arrow A (FIG. 3) by suitable rotary drive means (not shown). As best shown in FIG. 4, the knife plate 51 is aligned with a small gap G between the two clamp slide members 42 and 32.

In the operation of steak slicer 10, the two clamp slides 32 and 42 are initially moved to the full open position shown in FIG. 2. A segment of fresh whole-muscle meat 47, in this instance a strip loin, is placed on the support rods 46 and advanced down the support rods in the direction of the arrow B (FIGS. 1 and 3) until the face of the meat segment is aligned in surface-to-surface engagement with stop plate 28. The biasing means comprising weight 48 urges meat segment 47 into firm engagement with the stop plate.

With meat segment 47 in position, drive cylinder 35 is actuated to move clamp slide 32 to the left, as seen in FIG. 2, to the position indicated by the phantom outline 32A. This effectively constrains a predetermined thickness of the meat segment immediately adjacent stop plate 28 into a given cross-sectional shape, that of the phantom outline 32A. The constrained thickness is the thickness of the elements 31 and 32 of the first shaping clamp.

At the same time, or shortly thereafter, the second shaping means comprising clamp 41,42 is actuated.

Thus, drive cylinder 45 is energized to shift slide 42 to the left, as seen in FIG. 2, to a position of conformance to the configuration 32A. In this manner, an additional part of the meat segment, immediately adjacent the first shaping clamp 31,32, is also constrained into approximately the same cross-sectional configuration as in the first clamp.

With the meat segment firmly shaped and constrained in the two shaping means comprising clamps 31,32 and 41,42, the cutting knife 51 is actuated. The knife moves down between the two shaping clamp, with the meat still under constraint, cutting off the face portion of the meat segment 47 that is held in the first clamp 31,32 and forming a steak or other meat portion of controlled volume. After the steak is cut, stop plate 28 is pulled outwardly of steak slicer 10 as generally indicated by arrow C in FIG. 4 and clamp slide 32 is moved back to its original position as shown in FIG. 2, freeing the newly sliced steak for removal from steak slicer 10. At the same time, or shortly thereafter, the second clamp slide 42 is also restored to its original position.

The operation as described above is continued to cut a series of steaks or other controlled-volume meat portions from the fresh whole-muscle meat segment 47. In cutting each steak, the following steps are performed:

A. The fresh whole-muscle meat segment 47 is advanced along a meat advancement path defined by the support members 46, transverse to the face of the meat segment, to bring the meat segment face into engagement with stop plate 28.

B. The face part of the meat segment 47, immediately adjacent stop plate 28, is constrained in the first shaping clamp 31,32 to a given cross-sectional shape (32A) and thickness, thereby constraining a predetermined volume of the meat in the first shaping means.

B'. Simultaneously with step B, or immediately thereafter, an additional part of meat segment 47, immediately behind the first shaping clamp 31,32, is constrained in the second shaping means, clamp 41,42, in the same cross-sectional shape as in the first clamp. Both of the shaping clamps are filled solidly due to continued bias in the direction of arrow B, by weight 48 or other appropriate means.

C. The face part of the meat segment, the part in the first shaping clamp 31,32, is then cut off by knife 51, in the gap G between the two shaping clamps, to form a steak or like controlled-volume meat portion in the first shaping clamp.

D. Stop plate 28 is then moved out of the way (arrow C) and the steak is removed from the first shaping clamp.

By repeating steps A through D, device 10 forms a plurality of additional controlled-volume meat portions, such as steaks, all cut from the same meat segment 47. After removal from steak slicer 10, the individual steaks may assume somewhat different shapes, due to the natural resiliency of the fresh whole-muscle meat. However, all of the steaks have the same volume and essentially the same weight, within acceptable tolerances. There is no requirement for particular skill on the part of the operator of the steak slicer. Equally importantly, there is no necessity to treat the meat in advance, as by freezing or partial freezing, to change its naturally resilient condition.

The configuration illustrated for the two shaping clamps 31,32 and 41,42 is appropriate to the processing of a strip loin in steak slicer 10, but the method and apparatus of the invention are readily adaptable to other cuts of meat. Thus, with shaping clamps of different configurations, the same basic apparatus and technique can be readily employed for slicing controlled-volume meat portions from a tenderloin, a rib-eye roll, a top sirloin butt, or virtually any other boneless cut of meat.

A change in steak size can also be readily accommodated. For a change in thickness, the first shaping clamp 31,32 is replaced by a similar shaping clamp of different thickness. For meat segments of substantially different cross-sectional size, the drives for the two clamp slides 32 and 42 can be indexed to stop at varying positions. Of course, steak slicer 10 should be set up and used to cut a succession of meat segments of generally similar size and configuration before making a substantial change, so that set-up time does not become a major factor mitigating against use of the invention.

I claim:

1. The method of cutting successive controlled-volume meat portions from the face of a segment of fresh whole-muscle meat, comprising the following steps:

A. advancing a fresh whole-muscle meat segment along a given meat advancement path transverse to the face of the meat segment, into firm engagement with a stop plate, without appreciable constraint on the cross-sectional configuration of the meat segment;

B. constraining only the face part of the meat segment, immediately adjacent the stop plate in a direction parallel to the face of the meat segment, in a shaping clamp of given thickness and of a given cross-sectional shape generally corresponding to the natural cross-sectional shape of the meat segment, thereby constraining a predetermined volume of the meat in the shaping clamp, without constraint of the remainder of the meat segment;

C. cutting off the face part of the meat segment, immediately behind the shaping clamp, while still under constraint, to form a controlled-volume meat portion in the shaping clamp;

D. removing the controlled-volume meat portion from the shaping clamp; and repeating steps A through D to form additional controlled-volume meat portions, cut from the same meat segment.

2. The method of cutting successive controlled-volume meat portions from the face of a segment of fresh whole-muscle meat, comprising the following steps:

A. advancing a fresh whole-muscle meat segment along a given meat advancement path transverse to one face of the meat segment, into firm engagement with a stop plate, without appreciable constraint on the cross-sectional configuration of the meat segment;

B. constraining the face part of the meat segment, immediately adjacent the stop plate in a direction parallel to the face of the meat segment, in a first shaping clamp of given thickness and of a given cross-sectional shape generally corresponding to the natural cross-sectional shape of the meat segment, thereby constraining a predetermined volume of the meat in the shaping clamp;

B'. constraining an additional part of the meat segment, immediately adjacent the first shaping clamp, in a direction parallel to the face of the meat segment, in a second shaping clamp of the same cross-sectional shape as the first clamp, steps B and B' being carried out without constraint of the remainder of the meat segment;

C. cutting off the face part of the meat segment, between the two shaping clamps, with the meat segment still under constraint in both clamps, to form a controlled-volume meat portion in the first shaping clamp;

D. removing the controlled-volume meat portion from the first shaping clamp; and repeating steps A through D to form additional controlled-volume meat portions, cut from the same meat segment.

3. The method of cutting controlled-volume meat portions, according to claim 1 or claim 2, including the additional step of continuously urging the meat segment toward the stop member to assure solidly filling the shaping clamp or clamps, without appreciably changing the shape of the meat segment.

4. A meat slicing device for cutting successive controlled-volume meat portions from the face of a segment of fresh whole-muscle meat, comprising:

a stop plate;

support means for supporting a fresh whole-muscle meat segment with the face of the meat segment aligned in surface-to-surface engagement with the stop plate, the support means permitting the meat segment to retain its normal cross-sectional configuration;

shaping means, including the stop plate, for constraining only a predetermined thickness of the meat segment immediately adjacent the stop plate into a configuration of given cross-sectional shape and thickness, without constraint to the remainder of the meat segment, the shaping means comprising a constrictive clamp having a clamp element movable in a direction parallel to the face of the meat segment, and having a cross-sectional shape generally corresponding to the natural cross-sectional shape of the meat segment;

and cutting means for cutting off the constrained face portion of the meat segment, immediately behind the shaping means, while still under constraint, to form a controlled-volume meat portion.

5. A meat slicing device for cutting successive controlled-volume meat portions from the face of a segment of fresh whole-muscle meat, comprising:

a stop plate;

support means for supporting a fresh whole-muscle meat segment with the face of the meat segment aligned in surface-to-surface engagement with the stop plate, the support means permitting the meat segment to retain its normal cross-sectional configuration;

first shaping means, including the stop plate, for constraining a predetermined thickness of the meat segment, at its face, into a configuration of given cross-sectional shape and thickness;

second shaping means for constraining an additional part of the meat segment, immediately adjacent the first shaping means, into approximately the same cross-sectional configuration as the first shaping means without constraint to the remainder of the meat segment;

each shaping means comprising a constrictive clamp having a clamp element movable in a direction parallel to the face of the meat segment, and having a cross-sectional shape generally corresponding to the natural cross-sectional shape of the meat segment;

and cutting means for cutting off the face portion of the meat segment, between the two shaping means, while still under constraint in both shaping means, to form a controlled-volume meat portion.

6. A controlled-volume meat slicing device according to claim 4 or claim 5, including a plurality of different shaping clamps of different cross-sectional configurations for processing different cuts of meat.

7. A controlled-volume meat slicing device according to claim 4 or claim 5, in which the stop plate is movable to a position clear of the meat segment face to permit removal of the controlled-volume meat portion from the device.

8. A controlled-volume meat slicing device according to claim 4 or claim 5, and further comprising biasing means urging the meat segment along the support means into firm engagement with the stop plate to assure solidly filling the shaping means.

9. A controlled-volume meat slicing device according to claim 8 including a plurality of different shaping clamps of different cross-sectional configurations for processing different cuts of meat.

10. A controlled-volume meat slicing device according to claim 8 in which the stop plate is movable to a position clear of the meat segment face to permit removal of the controlled-volume meat portion from the device.

* * * * *